June 15, 1965 — J. L. CARROLL ETAL — 3,189,229
INSULATED PITCHER
Filed Dec. 26, 1963
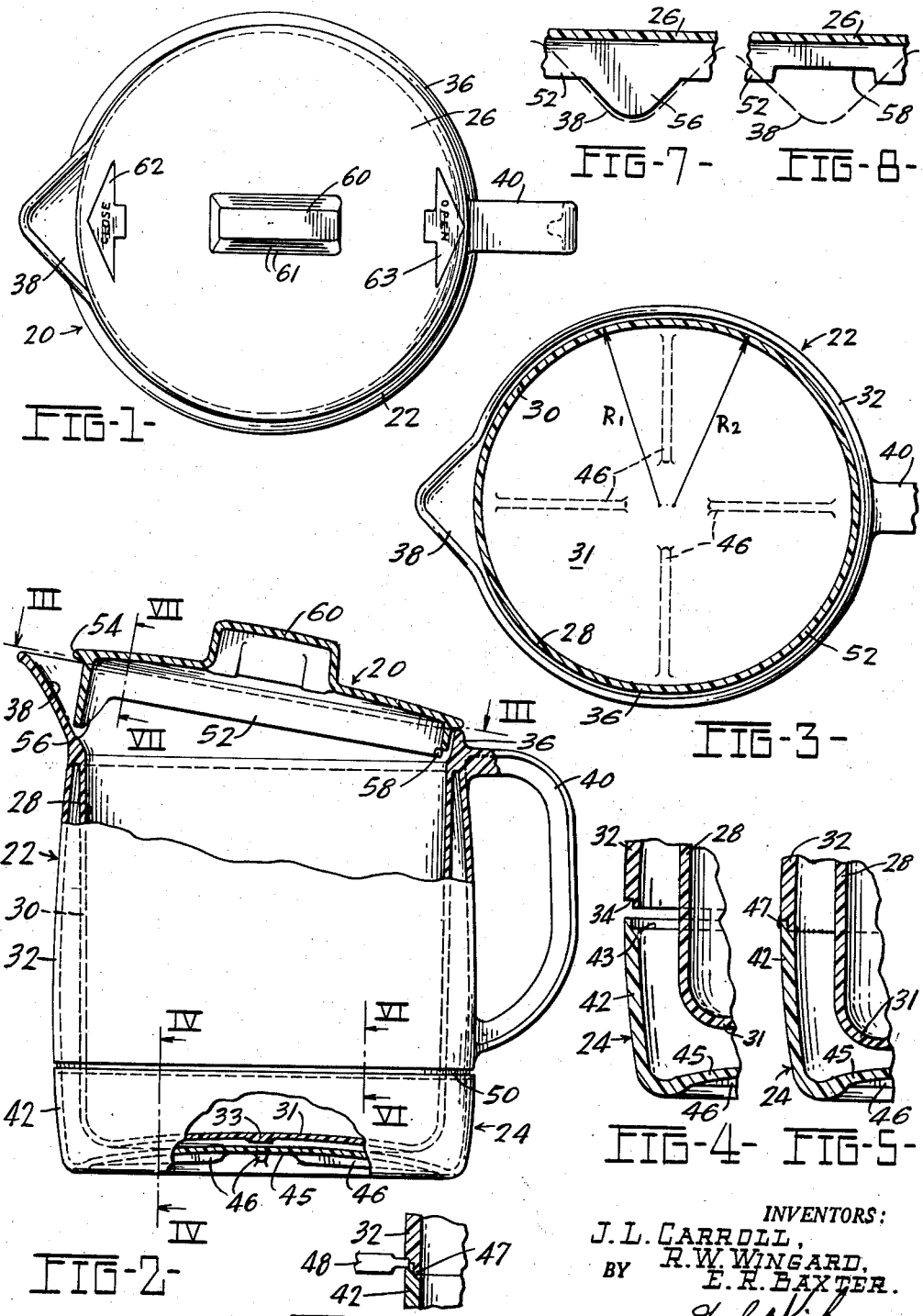

3,189,229
INSULATED PITCHER
John L. Carroll, Robert W. Wingard, and Earl R. Baxter, Fremont, Ohio, assignors to Quikut Incorporated, Fremont, Ohio, a corporation of Ohio
Filed Dec. 26, 1963, Ser. No. 333,296
7 Claims. (Cl. 222—183)

This invention relates to pitchers and the like and is particularly directed to a double walled insulated pitcher having an open top closed by a cover disposable in either of two positions to open or close a pouring spout.

An object of the present invention is to provide an inexpensive, efficient insulated pitcher of molded plastic material of the type that is resistant to heat and cold.

Another object of the invention is to produce a light weight insulated pitcher from but three molded parts including: (1) the cover; (2) the main body part comprising an inner container and a spaced outer casing joined to form a top annular wall in which is formed a pouring spout opposite a handle integral with the outer casing, the top wall being sloped upwardly from the handle to the pouring spout to provide an elliptical opening for the cover; and (3) the bottom of the pitcher being a separate cup-shaped part easily secured to the lower edge of the outer casing.

Another object of the invention is to provide an elliptical cover for a pitcher that is receivable in only two positions in the open top thereof, one closing the spout and the other opening the spout, and which cover is retained thereby due to the slope of the open top which produces an elliptical opening with the long dimension extending from front to rear.

The above mentioned and other features and objects of this invention and the manner of attaining them will become more apparent and the invention itself will be understood best by reference to the following description of an embodiment of the invention taken in conjunction with the accompanying drawing, wherein:

FIG. 1 is a top plan view of a pitcher incorporating the present invention, the cover being shown in spout closing position;

FIG. 2 is a combined side elevation and partial vertical sectional view of the pitcher with the cover in the position shown in FIG. 1;

FIG. 3 is a sectional detail view taken on a line III—III through the elliptical cover shown in FIG. 2;

FIG. 4 is an enlarged fragmentary sectional detail view taken substantially on a line IV—IV of FIG. 2 but showing the bottom of the pitcher prior to assembly with the body thereof;

FIG. 5 is a view similar to FIG. 4 after assembly;

FIG. 6 is a fragmentary detail view of the joint between the body and bottom of the pitcher taken along line VI—VI of FIG. 2, and showing a portion of a tool for cutting a groove in the joint area;

FIG. 7 is a detail sectional view taken along line VII—VII of FIG. 2 and showing the gate in the cover flange for closing the spout; and FIG. 8 is a view similar to FIG. 7 but of the diametrically opposite portion of the cover flange to show the notch therein to provide an opening when aligned with the spout.

Referring to the drawings, the pitcher shown generally at 20 in FIGS. 1 and 2 comprises a main body part 22, a bottom or base part 24 and a cover 26 each of which may be molded of plastic of a type that is resistant to heat and cold, such as polypropylene. The body part 22 includes an inner receptacle or container 28 having a generally cylindrical wall 30 and a bottom wall 31, and an outer casing or skirt 32 concentric with the wall 30 but terminating in a stepped lower edge 34 (FIG. 4) short of the bottom wall 31. The bottom wall may have a central downwardly projecting tip 33 in the event the weight of the liquid in the container 28 may stretch the container to contact the bottom part 24, the contact will only be at the tip 33 which will not materially reduce the insulation space between the bottom wall 31 and the bottom part 24. Receptacle 28 and casing 32 are joined at their upper ends by an annular top wall or rim 36 at one side of which is formed an outwardly extending depressed lip providing a pouring spout 38. Projecting from the side of casing 32 opposite spout 38 is a pitcher handle 40 molded integrally with casing 32 in a portable mold, separable along a line through the center of said handle 40 and said spout 38.

The bottom or base part 24 is a one-piece cup-shaped member having short side walls 42, the top edge 43 of which is stepped, and a concave bottom wall 45 with radially downwardly extending ribs 46. The bottom 24 is assembled with the body 22 by fitting the edge 43 onto edge 34 of casing 32 and subsequently spinning the bottom 24, by friction engagement with the ribs 46, relative to the body 22 to fuse the parts together at 47 (see FIG. 5). Accordingly, the bottom 24 becomes in effect a unitary part of the pitcher and a double wall is provided at the bottom as well as the sides of the pitcher. In order to finish the exterior and remove any fused seam, a suitable cutting tool 48 such as shown in FIG. 6 may be used to provide an annular groove 50 in the area of the joint 47.

The top wall or rim 36 is inclined upwardly from the handle 40 to the spout 38 which renders the open mouth elliptical with the long dimension from front to rear to receive the cover 26 which is also slightly elliptical. Cover 26 may have a depending flange 52 inwardly of the marginal edge 54 of the cover, flange 52 also being elliptical to fit within the rim 36 in either of two positions only. Flange 52 is provided with a downwardly projecting gate portion 56 (see FIG. 7) and an oppositely disposed notched portion 58 (see FIG. 8) to provide valve means by which the spout 38 may be either closed or opened to the pitcher interior. Centrally of the top surface of the cover 26 is an upstanding handle 60 with roughened sides 61, said handle being elongated lengthwise of the cover and aligned with the handle 60; and adjacent gate 56 and notch 58 respectively, are embossed arrows 62 and 63 bearing legends "close" and "open."

It will be noted that with the bottom 24 secured in place, a double walled structure is provided except where the inner and outer walls are joined to provide the top rim 36, a portion of which is depressed to form the base of the spout 38 for communication with the interior of the pitcher. The open top of the pitcher is normally closed by the cover which has but two positions therein, "close" or "open" due to the elliptical shape of the cover and the elliptical shape of the opening. When it is desired to dispense the contents of the pitcher, assuming that the cover 26 is in closed position to maintain the temperature of the contents somewhat constant, the cover is raised from the pitcher 20 and rotated one half turn and replaced. The upstanding handle 60 provides means for manipulating the cover and together with the arrows 62 and 63 embossed on the top of the cover in alignment with the handle 60 serves as means for indicating the positions of the gate 56 and the dispensing opening 58.

As described above, the angularity of the rim 36 with respect to the horizontal and therefore the vertical center line of the pitcher 20 renders the mouth of the pitcher elliptical. In order to provide a cover that will fit the mouth in either of the two positions only, the cover 26 is formed so that it is slightly longer from front to rear than from side to side as shown in FIG. 3 by radii lines R1 and R2 from spaced centers.

While there is described above the principles of this invention in connection with specific apparatus, it is to be clearly understood that this description is made only by way of example and not as a limitation to the scope of this invention.

What is claimed is:

1. A double walled plastic pitcher comprising:
   a main body member having an inner container and a spaced outer casing joined together to form a top annular wall,
   a pouring spout in said wall,
   a handle integral with said outer casing,
   said top wall being inclined upwardly from said handle to said spout to provide an elliptical opening,
   a cover having a depending flange inwardly of the marginal edge of said cover, said flange fitting within said opening in either of two positions and having an extended portion on said flange for closing said pouring spout, and a notched portion in said flange for opening said pouring spout.

2. An insulated pitcher comprising:
   a one-piece body of molded plastic having: an inner receptacle closed at the bottom and a spaced outer casing open at the bottom and terminating above the bottom of the inner receptacle, said container and casing being joined together to form a top annular wall, a pouring lip at one side of said top wall, a handle integral with said outer casing opposite said pouring lip, said top wall being inclined upwardly from said handle to said pouring lip to provide an elliptical opening,
   a cup-shaped closure for the outer casing forming a base for said pitcher,
   a cover for said pitcher having a depending flange inwardly of the marginal edge thereof, said flange having an extended portion for closing said pouring lip and an oppositely disposed slot for opening said pouring lip.

3. A plastic pitcher comprising:
   (A) a body portion comprising:
      1. an inner substantially cylindrical container portion having a bottom wall,
      2. an outer concentric skirt portion joined at its upper end to the upper end of said container portion to form a rim,
      3. said rim being at an angle to the axis of said cylindrical container portion to form an elliptical upper opening to said container,
      4. a spout projecting outwardly from said rim, and
      5. a handle projecting outwardly from said skirt portion diametrically opposite said spout,
   (B) a bottom cup portion fused at its rim to the bottom edge of said skirt portion to form with said skirt portion a housing spaced from said container thereby providing a double walled air space insulated pitcher,
   (C) a removable elliptical cover for said opening to said container portion resting on said rim.

4. A pitcher according to claim 3 wherein said bottom wall of said container includes a downwardly projecting tip to insure spacing of said bottom wall from the inner surface of said bottom cup portion.

5. A pitcher according to claim 3 wherein said cover comprises a downwardly projecting elliptical flange fittable inside said rim of said container portion.

6. A pitcher according to claim 5 wherein said flange has a downwardly projecting gate portion at one end of the longer axis of said elliptical cover to act as a closure for said spout.

7. A pitcher according to claim 5 wherein said flange has a notch at one end of the longer axis of said elliptical cover to act as an opening for said spout.

References Cited by the Examiner

UNITED STATES PATENTS

| 1,413,282 | 4/22 | Lowenstein | 222—545 |
| 2,599,332 | 6/52 | Kirman | 65—66 |
| 2,995,267 | 8/61 | Ostrander | 220—9 |

FOREIGN PATENTS 770,275  3/57  Great Britain.

LOUIS J. DEMBO, *Primary Examiner.*